United States Patent Office 3,629,456
Patented Dec. 21, 1971

3,629,456
BENZOHYDROXAMIC ACID FUNGITOXIC AGENTS
Ewald Urbschat, Cologne-Mulheim, and Paul-Ernst Frohberger Burscheid, Germany, assignors to Farbenfabriken Bayer Aktiengesellschaft, Leverkusen, Germany
No Drawing. Continuation of application Ser. No. 438,369, Mar. 9, 1965. This application July 26, 1968, Ser. No. 749,915
Claims priority, application Germany, Mar. 12, 1964, F 42,283
Int. Cl. A01n 9/20
U.S. Cl. 424—324                                    6 Claims

ABSTRACT OF THE DISCLOSURE

Benzo-, bis-benzo-, and mono- and di-chloro benzo- and bis-benzo- -hydroxamic acids, and compositions thereof with dispersible carrier vehicles, having fungitoxic activity and usable to combat fungi, especially Ustilago phytopathogenic fungi, in connection with seeds, plants and tillable agricultural soil.

---

This is a streamlined continuation application of copending U.S. application Ser. No. 438,369, filed Mar. 9, 1965, now abandoned.

The present invention relates to hydroxamic acids, and more particularly to certain new benzohydroxamic acids having valuable properties, to fungitoxic compositions containing these and other particular benzohydroxamic acids as fungitoxically active ingredients as well as to methods of combatting fungi therewith.

It is known that certain mercury compounds, for example, phenyl mercury acetate, can be used as fungitoxic active agents. Organic mercury compounds of this type are especially suitable as seed dressings. However, they suffer from the substantial disadvantage of having too high a toxicity towards warm-blooded animals. For this reason, there is an urgent need for replacing such organic mercury compounds by other less toxic compounds of similarly good activity.

The use of benzohydroxamic acids and of compounds with a similar chemical structure as fungitoxically active agents has hitherto not been described.

It is an object of the present invention to provide benzohydroxamic acids having valuable properties which render them useful as highly effective fungitoxic agents.

It is another object of the present invention to provide fungitoxic preparations containing novel and/or known benzohydroxamic acids, which possess highly effective fungitoxic properties, especially with regard to use in connection with plant fungi.

It is another object of the present invention to provide particular novel and/or known benzohydroxamic acids which possess a low toxicity to warm-blooded animals, no unpleasant odor, no irritating effect on the skin and the mucous membranes, yet which possess a good compatability with respect to plants.

It is still another object of the present invention to provide compositions or formulations of such novel and/or known benzohydroxamic acids with carrier vehicles, especially dispersible solid and liquid carrier vehicles.

It is still another object of the present invention to provide benzohydroxamic acids and compositions or formulations thereof with carrier vehicles, and/or with other known agriculturally beneficial, plant-treating agents, for example plant protective agents, as seed dressing agents and as tillable or cultivatable soil treating agents, whereby to inhibit accordingly fungus growth on seeds and/or in the soil which is to be seeded or which has been seeded or which contains plants susceptible to fungus blight.

It is a still further object of the present invention to provide methods for using such benzohydroxamic acids, and more specifically methods of combatting fungi by applying to seeds, plants and/or tillable or cultivatable soil, a fungitoxically effective amount of such benzohydroxamic acids.

Other and further objects of the present invention will become apparent from a study of the within specification and accompanying examples.

It has now been found in accordance with the present invention that hydroxamic acids of the general formula:

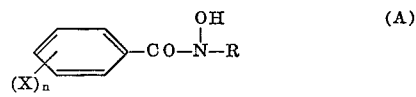
(A)

wherein X stands for a hydrogen or chlorine atom, R stands for a hydrogen atom or a benzoyl radical, which may be substituted by one or two chlorine atoms, and $n$ stands for 1 or 2, possess strong fungitoxic properties.

It is very surprising that benzohydroxamic acids of the foregoing type can be used for combatting undesirable fungus growth since no compounds of similar chemical structure have hitherto been known for this purpose. Advantageously, furthermore, the instant benzohydroxamic acids have only a comparatively low toxicity towards warm-blooded animals, no unpleasant odor, no irritating effect on the skin and the mucous membranes, yet have a good compatibility with plants.

The benzohydroxamic acids which may be used according to the present invention are clearly defined by general Formula A. Most of these acids are known but it has been discovered that those benzohydroxamic acids which are not known can be prepared conveniently in the same manner as the known benzohydroxamic acids. Thus, for example, monobenzohydroxamic acids are obtained by reacting benzoic acid esters with hydroxylamine, optionally in the presence of a solvent, at temperatures of, for example, 10–40° C. (cf. Organic Synthesis, II, 67). Bis-benzohydroxamic acids are obtained by reacting benzoic acid chlorides with hydroxylamine, optionally in the presence of a solvent, at temperatures of, for example, 10–40° C. (cf. Annalen, 161, 350).

Typical examples of benzohydroxamic acids which may be used according to the present invention are:

Benzohydroxamic acid of the formula:

I   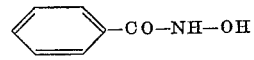

M.P. 125° C.

4-chlorobenzohydroxamic acid of the formula:

II   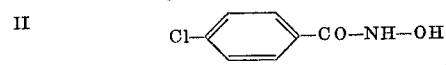

M.P. 161–63° C.

2-chlorobenzohydroxamic acid of the formula:

III 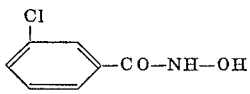

M.P. 174° C.

2,4-dichlorobenzohydroxamic acid of the formula:

IV 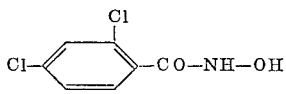

M.P. 155° C.

2,5-dichlorobenzohydroxamic acid of the formula:

V 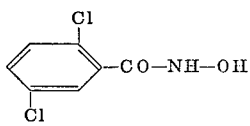

M.P. 159° C.

3,4-dichlorobenzohydroxamic acid of the formula:

VI 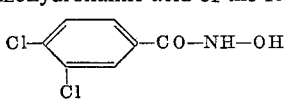

M.P. 159° C.

Bis(benzo)hydroxamic acid of the formula:

VII 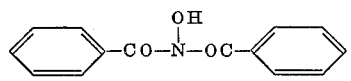

M.P. 145–46° C.

Bis(4-chlorobenzo)hydroxamic acid of the formula:

VIII 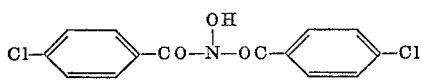

M.P. 166–67° C.

The benzohydroxamic acids of the present invention possess strong fungitoxic activity. Due to their low toxicity towards warm-blooded animals, they are suitable for combatting undesirable fungus growth. Their good compatibility with higher plants enables them to be used per se or in suitable formulations or preparations as plant protective agents against fungus plant diseases. They are especially suitable as fungitoxically active agents for seed dressings. Thus, for example, good fungitoxic results are obtained in combatting the group of the phyto-pathogenic fungus Ustilago.

The compounds which may be used according to the present invention can be utilized, if desired, in the form of the usual formulations with dispersible carrier vehicles, such as solutions, emulsions, emulsifiable concentrates, suspensions, spray powders, pastes, granulates, soluble powders, dusting agents, etc., and the like. These are prepared in known manner, for example, by extending the active agents with dispersible carrier vehicles such as solvents and/or solid carriers, optionally with the use of emulsifying agents and/or dispersing agents (cf. Agricultural Chemicals, March 1960, pages 35–38). The following can be chiefly considered as carrier vehicles or adjuvants for this purpose: solvents, such as aromatic hydrocarbons (for example, toluene, xylene or benzene, etc.), chlorinated aromatic hydrocarbons (for example, chlorobenzenes), paraffins (for example, petroleum fractions), alcohols (for example, methanol, propanol or butanol, etc.), amines (for example, ethanolamine), dimethylformamide, and water; finely divided solid carriers, such as natural ground minerals (for example, kaolins, alumina, talc and chalk) and synthetic ground minerals (for example, highly-dispersed silicic acid and silicates, e.g. alkali silicates, etc.); emulsifying agents, such as non-ionic and anionic emulsifying agents (for example, polyethylene oxide esters of fatty acids, polyethylene oxide ethers of fatty alcohols, alkyl sulfonates and aryl sulfonates, especially magnesium stearate, sodium oleate, etc.); and dispersing agents, such as lignin, spent sulphite liquors and methyl cellulose, etc.

The new compositions or formulations according to the present invention therefore comprises at least one benzohydroxamic acid of general formula (A) in admixture with a typical carrier vehicle of the foregoing type, such as a solid diluent or carrier, an organic solvent and an emulsifying agent capable of producing a stable emulsion when diluted with water, or water containing an auxiliary solvent and/or an emulsifying agent.

The compounds which may be used according to the present invention can also be present in the formulations in admixture with other known active ingredients for a combined overall effectiveness, although as aforesaid the particular benzohydroxamic acids of the present invention can be used per se due to ready adaptability to use as fungitoxic agents by application in the usual way, as noted below.

The formulations generally contain substantially between 0.1 and 95, preferably substantially between 0.5 and 90 percent by weight of active compound.

Generally, the benzohydroxamic acids of the present invention can be used as such, in the form of their formulations as with carrier vehicles or other active agents, or in the form of particular dosages, for specific application, such as in the physical form of powders, granulates, solutions, emulsions or suspensions. The application of the active fungitoxic agent is carried out in the usual manner, for example by spraying, atomizing, dusting, watering and, in particular, dressing, e.g. seed dressing. The seed dressing agents may exhibit a concentration of active ingredient substantially between about 1 and 100% and are normally applied in quantities of substantially between about 0.2–10 g. per kilogram of seed.

It is especially difficult to combat oat blight (Ustilago avenae). This was previously only possible with satisfactory results by means of organic mercury compounds and formaldehyde. However, such organic mercury compounds are too toxic, and formaldehyde strongly irritates the skin and mucous membranes. Furthermore, the use of formaldehyde may easily result in the seeds being damaged as for example where such agents are used as seed dressing agents. On the other hand, in accordance with the present invention, benzohydroxamic acids can also be used with good results for combatting oat blight but without exhibiting the disadvantages of the previously known compounds. For this purpose, the particular benzohydroxamic acid of the invention is used by itself or in combination with other suitable fungicidally active agents as aforesaid, perhaps as a so-called universal dressing agent.

The following examples are given for the purpose of illustrating, while not limiting, the present invention;

EXAMPLE 1

Agar plate test

Test for fungitoxic activity and breadth of activity spectrum

Solvent: Acetone

To produce a suitable preparation of the active benzohydroxamic acid compound, such active compound is taken up in at least 100 times its amount of solvent.

The preparation of the active compound is added to potato dextrose agar which has been liquefied by heating, in a quantity sufficient to ensure that the desired concentration of active compound results. After thorough shaking to achieve a uniform dispersion of the active compound, the agar is poured into petri dishes under sterile conditions. When the mixture of substrate and active compound has solidified, test fungi from pure cultures are placed on it in small discs of 5 mm. diameter. The petri dishes are then incubated for 3 days at 20° C.

After this time, the inhibiting action of the active compound on the mycelium growth is determined, taking into account the untreated control.

The active compounds, their concentrations, the test fungi and the inhibition effects achieved can be seen from the following table:

TABLE 1

Agar plate test

| Active compound | Concentration of active compound in substrate (p.p.m.), wt./wt. | Test fungus | Inhibition effect on mycelium growth |
|---|---|---|---|
| II, III [1] | 100 | Corticium rolfaii<br>Sclerotinia sclerotiorum<br>Thielaviopsis basicola<br>Phytophthora cactorum | Complete inhibition. |
| VI | 100 | Corticium rolfaii<br>Thielaviopsis basicola<br>Phytophthora cactorum | Do. |
| VII | 100 | Sclerotinia sclerotiorum<br>Thielaviopsis basicola<br>Phytophthora cactorum | Do. |
| I | 100 | Corticium rolfaii<br>Sclerotinia sclerotiorum<br>Thielaviopsis basicola | Do. |

[1] Each tested separately.

EXAMPLE 2

Seed dressing test/oat blight
Test for effectiveness as seed dressing against seed-borne fungus diseases.

To produce a suitable dry dressing, the active benzohydroxamic acid compound is extended with a mixture of equal parts by weight of talc and kieselguhr to give a finely-powdered mixture having the desired concentration of active compound.

To apply the dressing, oat seed, which is naturally infested with oat blight (*Ustilago avenae*), is shaken with 3 g. of dry dressing per kg. of seed in a closed glass flask. Two batches of 100 grains of the seed are sown 2 cms. deep in seed boxes containing a mixture of 1 part by volume of Fruhstorfer standard soil and 1 part by volume of quartz sand. The boxes are placed in a greenhouse at a temperature of about 18° C., kept normally moist and exposed to light for 16 hours daily. After 10–12 weeks, the oats flower and show healthy and diseased panicles (blighted panicles).

After this time, the number of diseased panicles is determined as a percentage of the total number of developed panicles. 0% means that no diseased panicles are present, whereas 100% means that all the panicles are diseased. The fewer diseased panicles are formed, of course, the more effective is the active compound.

The active compounds, their concentrations and the number of diseased panicles can be seen from the following table:

TABLE 2

Seed dressing test/oat blight

| Active compound | Concentration of active compound in dressing, percent | Number of blighted panicles in percent of total number of developed panicles |
|---|---|---|
| III | 1 | 2.7 |
|  | 3 | 2.6 |
|  | 10 | 0.8 |
|  | 20 | 0.0 |
|  | 30 | 0.0 |
| VI | 10 | 2.5 |
|  | 20 | 0.0 |
|  | 30 | 0.0 |
| VII | 10 | 0.8 |
|  | 20 | 0.8 |
|  | 30 | 0.0 |
| Untreated | 0 | 18.4 |

To carry out a field test for demonstrating the effectiveness as dressing against oat blight (*Ustilago avenae*) of the compounds of the present invention, the dry dressing of the naturally-infested seed is carried out in the same manner. However, batches of 100 g. of seed are sown on allotments of 5 square meters in 5 repeats (i.e. 5 separate areas of square meters each). This amounts to a total of about 15,000 grains per 25 square meters for every test unit. Sowing is carried out in early April and the count of healthy and diseased panicles in late June. The results are set out in the following table.

TABLE 3

Oat blight field test

| Active compound | Concentration of active compound in dressing, percent | Number of blighted panicles in percent of total number of developed panicles |
|---|---|---|
| I | 30 | 0.05 |
| II | 30 | 0.03 |
| VIII | 30 | 0.75 |
| Untreated | 0 | 7.72 |

It will be seen in accordance with the foregoing that various carrier vehicles may be used for the particular compounds of the invention, that is, alone or in admixture with one or more of the active agents. Preferably, the dispersible carrier vehicles contemplate:

(1) Dispersible solids, such as finely divided solids, including natural ground minerals, e.g. kieselguhr, talc, kaolins, aluminas, chalk, etc., and synthetic ground minerals, e.g. highly-dispersed silicic acid, alkali silicates, etc.:

(2) Dispersible mixtures of organic liquid solvents and emulsifying agents capable of producing stable dispersible emulsions when diluted with water, such as mixtures of one or more solvents, including aromatic hydrocarbons, e.g. toluene, xylene, benzene, etc.; chlorinated aromatic hydrocarbons, e.g. chlorobenzenes; paraffins, i.e. liquid petroleum fractions; alcohols, e.g. methanol, propanol, butanol, etc.; amines, e.g. ethanolamine; amides, e.g. dimethyl-formamide, etc.; with one or more emulsifying agents, including nonionic and anionic emulsifying agents, e.g. polyethylene oxide esters of fatty acids, polyethylene oxide ethers of fatty alcohols, alkyl sulfonates, aryl sulfonates, especially magnesium stearate, sodium oleate, etc., whereby to produce in admixture with water such stable dispersible emulsions; and (3) So-produced dispersible mixtures of water with one or more auxiliary solvents of the type mentioned under paragraph 2 hereinabove and/or one or more emulsifying agents of the type mentioned under such paragraph 2.

Of course, suitable dispersing agents such as lignin, spent sulphite liquors, methyl cellulose, etc. can be added to the carrier vehicles of the types noted in paragraphs 1, 2 and 3 hereinabove, as desired, for enhanced effects.

The compounds per se and formulations thereof with carrier vehicles, and/or including one or more other active agents beneficial to seeds or plants or soil, can be applied as seed dressings to all kinds of seeds which are to be stored for future use, whereby to protect the same against the usual types of fungi in storage, and which are to be immediately planted, whereby to protect the same against the usual types of fungi in the soil. In either case, the seeds suffer no ill effects because of the presence of the compound or compounds according to the present invention, whether used per se or in the form of compositions or formulations with carrier vehicles, etc. Also, such compounds or their formulations can be applied directly to the soil before or after seeding has taken place, e.g. tillable, i.e. cultivatable, or agricultural soil, or even to plants growing in such soil. The compounds of the present invention as aforesaid possess good compatibility with plants, seeds and soil, and possess a comparatively low toxicity toward warm-blooded animals, yet have no unpleasant odor nor irritating effect on the skin or mucous membranes.

Most particularly, the benzohydroxamic acids which possess the desired fungitoxic activity and which may be used alone or in the form of suitable preparations to combat fungi in seeds, soil and/or plants, contemplate in accordance with a specific embodiment of the invention those benzohydroxamic acids having the formula

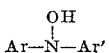

in which Ar is selected from the group consisting of benzoyl, monochlorobenzoyl and dichlorobenzoyl, and Ar' is selected from the group consisting of hydrogen, benzoyl, monochlorobenzoyl and dichlorobenzoyl. In particular, those compounds having the formula

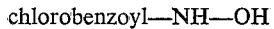

as well as those having the formula

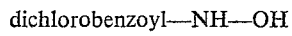

and those having the formula

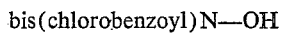

have been found to be suitably effective for the instant purposes.

It will be appreciated that the instant specification and examples are set forth by way of illustration and not limitation, and that various modifications and changes may be made without departing from the spirit and scope of the present invention.

What is claimed is:

1. Method of combating USTILAGO phytopathogenic fungi which comprises applying to such fungi a fungitoxically effective amount of a benzohydroxamic acid compound having the formula

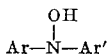

in which Ar is selected from the group consisting of benzoyl, meta- and para-chlorobenzoyl and ortho, meta-, ortho, para- and meta, para-dichlorobenzoyl, and Ar' is selected from the group consisting of hydrogen, benzoyl, and para-chlorobenzoyl.

2. Method according to claim 1 wherein said compound is applied in the form of a mixture with a dispersible carrier vehicle, such compound being present in a fungitoxically effective amount and constituting substantally between about 0.1–95% by weght of the mixture.

3. Method according to claim 1 wherein such compound is benzohydroxamic acid having the formula

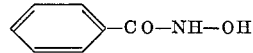

4. Method according to claim 3 wherein said compound is applied in the form of a mixture with a dispersible carrier vehicle, such compound being present in a fungitoxically effective amount and constituting substantially between about 0.1–95% by weight of the mixture.

5. Method according to claim 1 wherein such compound is bis(parachlorobenzo)hydroxamic acid having the formula

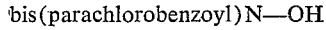

6. Method according to claim 1 wherein such compound is bis(benzo)hydroxamic acid having the formula

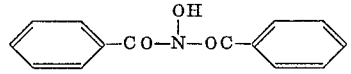

References Cited

Chemical Abstracts 53: 5573g (1959).
Chemical Abstracts 63: 18966d (1965).
Chemical Abstracts 65: 6231g (1966).
Alkiewiez et al., Nature, vol. 180, Nov. 30, 1957, pp. 1204–1205.

JEROME D. GOLDBERG, Primary Examiner